United States Patent [19]
Takeda et al.

[11] 3,914,287
[45] Oct. 21, 1975

[54] METHOD FOR THE RECOVERY OF DIMETHYL TEREPHTHALATE AND INTERMEDIATE PRODUCTS THEREOF

[75] Inventors: Shinichi Takeda; Tomio Harada; Koshi Namie, all of Matsuyama; Kotaro Hara, Musashino, all of Japan

[73] Assignee: Teijin Hercules Chemical Co., Ltd., Tokyo, Japan

[22] Filed: Mar. 2, 1973

[21] Appl. No.: 337,715

[30] Foreign Application Priority Data
Jan. 18, 1973    Japan.................................. 48-7339

[52] U.S. Cl. ... 260/475 R; 260/343.2 R; 260/475 B; 260/476 R; 260/524 R
[51] Int. Cl.$^2$......................................... C07C 69/82
[58] Field of Search ..................... 260/475 B, 475 R

[56] References Cited
UNITED STATES PATENTS
3,277,153    10/1966    Pieroh............................ 260/475 B FOREIGN PATENTS OR APPLICATIONS
46-6412    2/1971    Japan.............................. 260/475 B
2,144,920    4/1972    Germany........................... 260/475

Primary Examiner—Lorraine A. Weinberger
Assistant Examiner—E. Jane Skelly
Attorney, Agent, or Firm—Sherman & Shalloway

[57]    ABSTRACT

A method of recovering dimethyl terephthalate and the intermediate products thereof which comprises heating a starting distillation residue to 260° – 400°C. to form dimethyl terephthalate and the intermediate products thereof and recovering them; said starting distillation residue resulting from the steps of oxidizing p-xylene and/or methyl p-toluate at liquid phase with molecular oxygen or a molecular oxygen-containing gas, in the presence of A. manganese metal or a manganese compound which is at least partially soluble in the reaction system, and B. cobalt metal or a cobalt compound which is at least partially soluble in the reaction system, esterifying the resulting reaction mixture with methanol, and distilling the esterified product to separate therefrom the formed crude dimethyl terephthalate and other products having the boiling points lower than that of dimethyl therephthalate.

11 Claims, 1 Drawing Figure

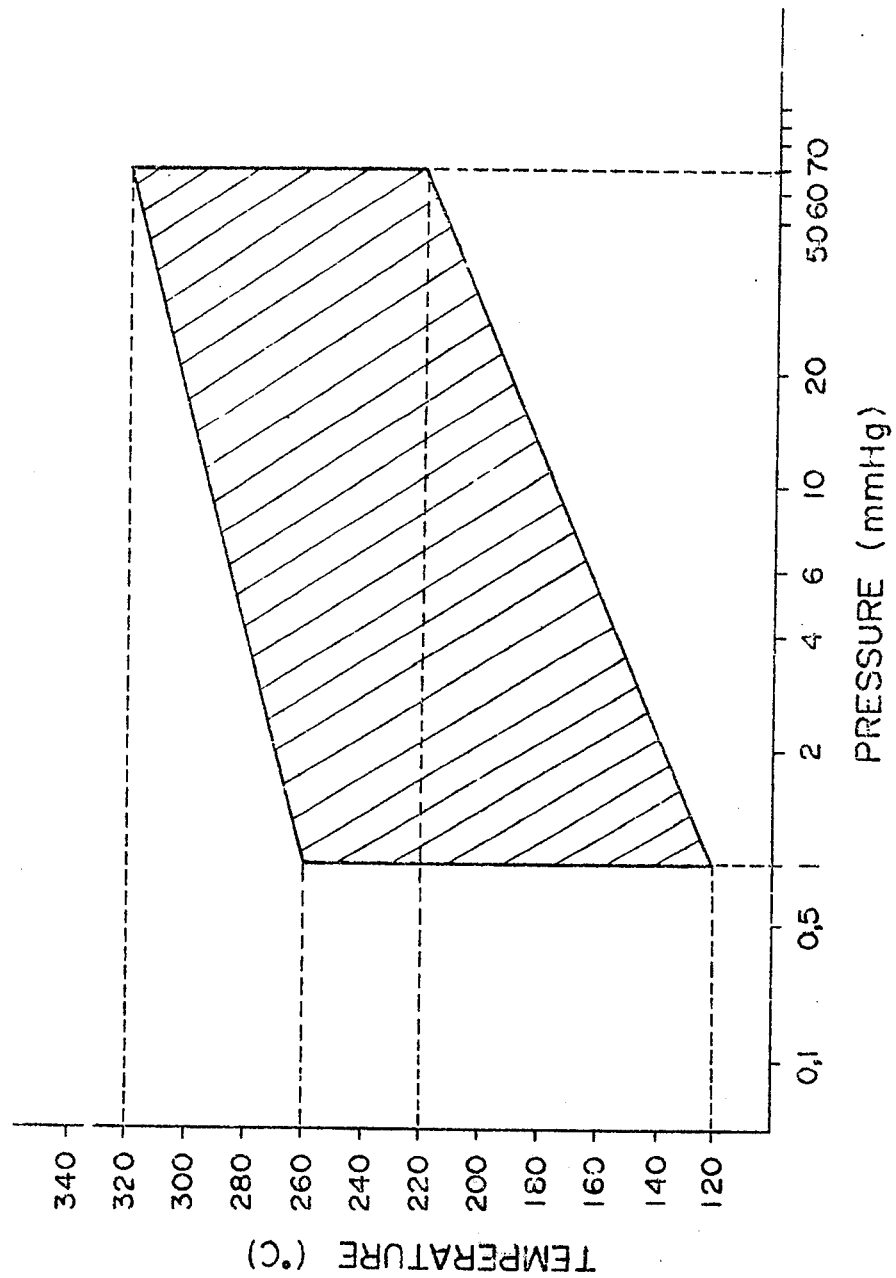

METHOD FOR THE RECOVERY OF DIMETHYL TEREPHTHALATE AND INTERMEDIATE PRODUCTS THEREOF

This invention relates to a method of recovering dimethyl terephthalate and intermediate products thereof, from the distillation residue which is obtained through the process comprising oxidizing p-xylene and/or methyl p-toluate with molecular oxygen or a molecular oxygen-containing gas at liquid phase, in the presence of (A) manganese metal or a manganese compound which is at least partially soluble in the reaction system (component A) and (B) cobalt metal or a cobalt compound which is at least partially soluble in the reaction system (component B), esterifying the resulting reaction mixture with methanol, and distilling the esterified product to separate therefrom crude dimethyl terephthalate and the products having the boiling points lower than that of dimethyl terephthalate.

The "intermediate products" mentioned above signify the compounds which can form dimethyl terephthalate upon oxidation and/or methyl-esterification, such as methyl p-toluate, p-toluic acid, methyl p-formylbenzoate, and monomethyl terephthalate.

The term, "reaction system" is used herein to signify the reaction mixture including not only the starting material, i.e., p-xylene and/or methyl p-toluate, but also the main oxidation products, i.e., p-toluic acid and/or monomethyl terephthalate, as well as the intermediate products formed in the process of oxidizing the foregoing, such as terephthalic acid, p-methylbenzyl alcohol, p-tolu aldehyde, methyl p-formylbenzoate, p-formylbenzoic acid, etc., which can be ultimately converted to dimethyl terephthalate through further oxidation and/or methyl-esterification, and other impurities formed by side-reactions.

The process comprising the steps of oxidizing p-xylene and/or methyl p-toluate at liquid phase with molecular oxygen or a molecular oxygen-containing gas in the presence of catalyst, esterifying the resulting reaction mixture with methanol, and distilling the esterified product to recover crude dimethyl terephthalate, is known. Such a process is occasionally referred to as Witten or Witten-Hercules process.

As the typical embodiments of oxidation of p-xylene and/or methyl p-toluate by the Witten or Witten-Hercules process, more specifically the following three are known.

i. "Four-stage" process

In the preparation of dimethyl terephthalate from p-xylene, first p-xylene is oxidized at liquid phase with a molecular oxygen-containing gas in the presence of a catalyst, to form the oxidation product composed chiefly of p-toluic acid (first stage oxidation); then the product is esterified with methanol, and the so formed methyl p-toluate is again oxidized in the manner similar to the above (second stage oxidation); the product is again similarly esterified, and crude dimethyl terephthalate is separated from the reaction mixture. (see, for example, British Pat. No. 727,989.)

ii. "Two-stage" process

In the preparation of dimethyl terephthalate from p-xylene by the method normally referred to as "two-stage" process, a mixture of p-xylene with methyl p-toluate is oxidized at liquid phase with a molecular oxygen-containing gas, to form the oxidation product composed chiefly of p-toluic acid and monomethyl terephthalate, which is then esterified with methanol, and from the resulting reaction mixture composed chiefly of methyl p-toluate and dimethyl terephthalate, crude dimethyl terephthalate is separated (see, for example, British Pat. No. 809,730).

iii. Improved two-stage process

This is an improvement of the above two-stage process (ii), in which a mixture of p-xylene and methyl p-toluate is partially oxidized with a molecular oxygen-containing gas at liquid phase in the first stage, and in the second and subsequent stages further oxidation is performed continuously under additional supply of p-xylene. The thus obtained oxidation product is esterified with methanol, and the formed crude dimethyl terephthalate is separated from the reaction mixture (see, for example, British Pat. No. 864,106).

In the foregoing processes (i), (ii), and (iii), the formed dimethyl terephthalate is normally separated by distillation. Consequently, the intermediate products having the boiling points lower than that of dimethyl terephthalate, such as methyl p-toluate, methyl p-formylbenzoate, and p-tolualdehyde, etc., are also separated with dimethyl terephthalate by the distillation. Thus separated intermediate products can be converted to dimethyl terephthalate upon further oxidation and methyl-esterification. Conventionally, the distillation residue remaining after the separation of dimethyl terephthalate and the intermediate products boiling at lower temperatures as above is either discarded or, at best, utilized as a fuel.

As the catalyst useful in the oxidation of p-xylene and/or methyl p-toluate with molecular oxygen as above, known disclosures proposed wide varieties of metals and metallic compounds which could be polyvalent (e.g., British Pat. No. 809,730, U.S. Pat. No. 2,894,978). In practice, however, cobalt metal or a cobalt compound which is soluble in the reaction system, such as cobalt acetate, has been used as substantially the only practicable catalyst.

We have studied the oxidation process of p-xylene and/or methyl p-toluate with molecular oxygen described above, and find that the concurrent use of A. manganese metal or a manganese compound which is at least partially soluble in the reaction system (component A) and B. cobalt metal or a cobalt compound which is at least partially soluble in the reaction system (component B) as the catalyst assists the formation of the useful products including dimethyl terephthalate and the aforenamed intermediate products at greater reaction rate and higher yield compared with the cases employing the conventional catalyst. Furthermore, the products are free of objectionable colors. Application Ser. No. 177,454 has been filed for the above process.

The process of the above prior application comprises oxidation of p-xylene and/or methyl p-toluate, and especially a mixture of p-xylene and methyl p-toluate at the blend ratio ranging from 2:1 to 1:4, by weight, in the presence of a catalyst containing the already defined components A and B at the ratio ranging from 0.1:99.9–99:1, preferably 1:99–90:10, by gram-atomic ratio of manganese metal to cobalt metal, the total of the manganese metal and cobalt metal in the catalyst being present at the concentration of 50–1500 ppm, preferably 80–500 ppm, in the total reaction mixture, at 140°–240°C., preferably 160°–220°C. The process is particularly advantageous when the catalytic components A and B are used at such quantities that, as converted respectively to manganese metal and cobalt metal, the concentration of manganese metal in the reaction mixture should have the range 0.3–40 ppm, particularly 0.5–20 ppm, and that of cobalt metal, 50–500 ppm, particularly 80–300 ppm, because thereby still more color-free useful products are obtained at higher yield.

The above process is unique in that no aliphatic acid soluent such as acetic acid or a corrosive accelerator such as bromine or a bromine compound is employed.

In the conventional oxidation processes using the known cobalt-containing catalyst, the reaction temperature range is practically limited to 140°–160°C. At higher temperatures the formation of by-products rapidly increases, although a greater reaction rate is obtained, and object product is heavily colored. Thus, while conventionally the reaction temperatures higher than 160°C. could not be employed without inviting extreme practical disadvantages, the above-described process of our prior application enables the performance of the oxidation reaction more advantageously at such high temperature ranges as 160°–220°C., particularly 170°–200°C. Furthermore, it is the very unique advantage of the specified two-component catalyst that it allows recovery of the useful products free of coloring at an extremely high reaction rate and high yield, at such a high reaction temperature range.

We have further studied the reaction products of the prior process using the catalyst consisting of the specified components A and B, to discover that, in the oxidation process of p-xylene and/or methyl p-toluate using the two-component catalyst in which the reaction product is methyl-esterified and then distilled, the quantity of the distillation residue remaining after the recovery of dimethyl terephthalate together with the oxidized and methyl-esterified products having the boiling points lower than that of dimethyl terephthalate (e.g., methyl p-toluate, methyl p-formylbenzoate, etc.) is greater than that normally obtained through the similar oxidation processes using a conventional cobalt catalyst.

According to our researches, the reason for the above quantitative increase in the distillation residue is that, in the oxidation process using the specified two-component catalyst, the quantities of carbon monoxide, carbon dioxide and such fatty acids, for example, as formic and acetic acids side-produced by the oxidation reaction, are reduced compared with the conventional processes using the component B alone as the catalyst, but the side-production of higher temperature-boiling products is increased in the former over the latter, by approximately 20–30 percent.

Therefore, it is obvious that the utility of the oxidation process using the components A and B as the catalyst can be greatly increased if the distillation residue could be converted to useful products.

Accordingly, the object of the present invention is to provide a method for converting such a distillation residue again to useful products.

Another object of the invention is to provide a method to form dimethyl terephthalate and useful intermediate products thereof from the distillation residue, and to recover the useful products.

Still other objects and advantages of the invention will become apparent from the following specification.

According to the invention, the foregoing objects and advantages are achieved by heating the distillation residue to a temperature within the range of 260°–400°C. to form dimethyl terephthalate and intermediate products thereof and recovering the useful products. The distillation residue is that obtained through the process comprising oxidizing p-xylene and/or methyl p-toluate at liquid phase with molecular oxygen or a molecular oxygen-containing gas, in the presence of A. manganese metal or a manganese compound which is at least partially soluble in the reaction system (component A) and B. cobalt metal or a cobalt compound which is at least partially soluble in the reaction system (component B), esterifying the resulting reaction mixture with methanol, and distilling the esterified product to separate therefrom crude dimethyl terephthalate and the intermediate products having the boiling points lower than that of dimethyl terephthalate.

The separation of dimethyl terephthalate and the useful intermediate products such as methyl p-toluate and methyl p-formylbenzoate, etc. from the methylesterification product by distillation has heretofore been practiced by normally maintaining the bottom temperature of the distillation column at 200°–240°C., at the highest 250°C., under a reduced pressure of 50–200 mm Hg.

The reason for separating the useful products, composed mainly of dimethyl terephthalate, by the reduced pressure distillation as above is to facilitate the separation of dimethyl terephthalate while preventing the coloring of the product, as well as to prevent the conversion of the metallic component in the oxidation catalyst to the metal oxide or free metal, particularly at high temperatures, which precipitates on the heat-transfer surfaces of the heat-exchanger to reduce the heat-transfer efficiency and cause clogging. Obviously, employment of excessively high temperatures for the separation of dimethyl terephthalate by distillation is thermally uneconomical.

We have discovered that when the above distillation residue, which remain after separating the useful products such as dimethyl terephthalate, methyl p-toluate, etc., from the methyl-esterified product, is heated to 260°–400°C., preferably 280°–380°C., particularly 300°–370°C., according to the subject method, surprisingly large quantities of useful products, such as, besides dimethyl terephthalate, those intermediates including methyl p-toluate, p-toluic acid, methyl p-formylbenzoate, monomethyl terephthalate, etc., can be recovered from said distillation residue.

In the above heat-treatment, particularly dimethyl terephthalate and methyl p-toluate are formed as the main products. The useful products can be separated and recovered by, for example, distilling the so heated distillation residue. The distillation may be performed simultaneously with the heat-treatment, or in separate sequence to the heat-treatment.

The above temperature range is employed for the heat-treatment according to the invention, because at temperatures below 280°C., particularly below 260°C., the recovery ratio of the named useful components is low, and at temperatures exceeding 380°C., particularly above 400°C., objectionable side-reaction takes place to reduce the recovery ratio and also carbide is precipitated to cause reduction in heat-conductivity or clogging of the apparatus.

Therefore, the heat-treatment of this invention is performed at 280°–380°C., particularly 300°–370°C., with advantage.

Our studies revealed that the distillation residue remaining after separating by distillation the useful products such as dimethyl terephthalate from the methyl-esterified oxidation product which is obtained by oxidizing p-xylene and/or methyl p-toluate in the presence of a cobalt compound (component B) according to the conventional practices and subsequently methyl-esterifying the product, surprisingly possesses a composition conspicuously different from that of the distillation residue obtained in our previously proposed process performing the oxidation under the concurrent use of a manganese compound (component A) and cobalt compound (component B). As demonstrated in the later given Examples and Controls, upon the heat-treatment under identical conditions, only approximately 5 percent by weight or less of the former distillation residue is converted to the useful products composed chiefly of dimethyl terephthalate. In contrast, 20 to 40% by weight, or even more, of the latter distillation residue can be re-converted to the useful products when it is heat-treated under the appropriate conditions. This is indeed surprising.

Thus, the heat-treatment specified in this invention is extremely meritorious when it is performed in combination with the afore-described oxidation process employing the two-component catalyst system consisting of the components A and B. Particularly when p-xylene and/or methyl p-toluate is oxidized in the presence of the catalyst consisting of the components A and B, at relatively high temperatures such as 160°–220°C., and especially 170°–200°C., and the oxidation product is methyl-esterified, the distillation residue still increases quantitatively, with the advantage that still higher conversion to the useful products can be achieved when the distillation residue is subjected to the heat-treatment according to the present invention.

Accordingly, the heat-treatment of the invention is particularly advantageous when practiced in combination with the high-temperature oxidation reaction as above-described, achieving conspicuous increase in total yield of dimethyl terephthalate from p-xylene.

The composition of the distillation residue obtained after separating by distillation the useful products such as crude dimethyl terephthalate from the methyl-esterified oxidation product resulting from the oxidation using the specified two-component catalyst has not yet been precisely determined. According to our studies, most likely the residue is composed of various high-temperature boiling products including diphenyl compounds such as dimethyl 4,4'-diphenyldicarboxylate and trimethyl 2,4', 5-diphenyltricarboxylate; benzocoumarin compounds such as dimethyl 3,4-benzocoumarindicarboxylate; and benzylbenzoate compounds such as dimethyl 4,4'-benzylbenzoatedicarboxylate. Besides the foregoing, presumably the residue contains large amounts of high molecular compounds which have at least three benzene rings in one molecule and colored tar-like high-temperature boiling by-products of which the structure is unknown.

When such distillation residue is heat-treated in accordance with the present invention, although the particulars of the reaction mechanism has not yet been clear, it is believed that thermal decomposition and ester-interchange reaction of, for example, the benzylbenzoate compounds take place and decarboxylation, decarbonylation and the like also take place, judging from the fact that generation of carbon dioxide and monoxide is observed during the heat-treatment. Furthermore, ester-interchange reactions of the formed p-toluic acid, monomethyl terephthalate, etc., to the corresponding methyl-esterified compounds are likely to occur.

According to a preferred embodiment of the invention, the distillation residue is heat-treated for the time (Q) that will satisfy the expression (1) below, with still greater recovery of the useful components.

$$Q \geq \frac{20}{T-250} \quad (1)$$

[in which T denotes the heat-treating temperature (°C.), and Q denotes the heat-treating time (hr.)]

The heat-treatment of the present invention is performed with still greater advantage for the time (Q) as will satisfy the expression (2) below, and especially, the expression (3):

$$\frac{50}{T-250} \leq Q \leq \frac{1500}{T-250} \quad (2)$$

$$\frac{100}{T-250} \leq Q \leq \frac{1000}{T-250} \quad (3)$$

Excessively prolonged heat-treating time is not only uneconomical, but also objectionable because it causes a rise in viscosity of the residue thus rendering its handling difficult, and a reduction in the recovery amount of the useful component.

As the distillation residue to be heat-treated according to the invention, i.e., the residue remaining after the separation of useful products such as crude dimethyl terephthalate as aforesaid, that containing the useful products such as dimethyl terephthalate and intermediate products thereof, e.g., p-toluic acid, monomethyl terephthalate, etc., to a minor degree, is equally useful as that which is substantially free of dimethyl terephthalate.

The distillation residue useful for the invention normally contains approximately 0.05–0.5 percent by weight of the cobalt and manganese compounds used as the oxidation catalyst, calculated as the corresponding pure metals. Those residual cobalt and manganese compounds may be left in the residue during the heat-treatment of this invention, or may be partially or substantially recovered by, for example, extraction, before the heat-treatment. Thus recovered metal compounds can be re-used as the oxidation catalyst.

Because the distillation residue to be used in this invention contains the various high-temperature boiling compounds as aforesaid, the residue can be heat-treated at the specified high temperatures with the manganese compound (catalytic component A) and cobalt compound (catalytic component B) remaining therein, with no such detrimental results as reduction and precipitation of the catalytic components and other disadvantages incidental thereto, unlike the case of distilling the useful products such as dimethyl terephthalate off from the methyl-esterified product. This is another advantage of the present invention.

It is preferred, however, that the heat-treatment should be practiced at the temperatures not exceeding 370°C., when the cobalt and manganese compounds are present in the distillation residue.

When the residual cobalt and manganese compounds are separated from the distillation residue in advance of the heat-treatment so that the treatment is practiced in the substantial absence of the metallic compounds, temperatures above 300°C. are employed with advantage.

The heat-treatment of the invention may be practiced in the presence of known ester-interchange catalysts such as the compounds of zinc, titanium, etc. besides the aforenamed components A and B.

Again, temperatures not exceeding 370°C. are preferably employed for the heat-treatment performed in the presence of such ester-interchange catalyst. It is also permissible to add a minor amount of alcohols such as methanol to the distillation residue to be heat-treated.

The heat-treatment according to the invention can be effected by various means such as the following.

(I) The distillation residue is heated under an elevated pressure in a closed pressure vessel.

(II) The heating is effected at normal pressure in an open vessel.

(III) The heating is effected while continuously distilling the formed useful products off from the system, at normal or reduced pressure.

Among the above, the means (III) is particularly advantageous since it achieves the greatest yield of useful products and the treating time can also be shortened.

The present method can be practiced either batchwise or continuously. In either system dimethyl terephthalate and other intermediate products which can be converted to dimethyl terephthalate by oxidation and/or methyl-esterification, such as methyl p-toluate, methyl p-formylbenzoate, p-toluic acid, and monomethyl terephthalate, can be easily separated and recovered from the heat-treated product by, for example, distillation.

As already mentioned, the distillation residue also contains various methyl esters of diphenylcarboxylic acids which are industrially useful as the starting materials of high molecular compounds. According to our studies, if the distillation residue is again distilled under a reduced pressure as it is to recover therefrom the distillate of methyl esters of diphenylcarboxylic acids, the distillate contains large amounts of compounds other than the intended methyl esters, and the subsequent separation of components is operatively difficult. Whereas, when the distillation residue is heat-treated to 260°-400°C. in accordance with the subject method, and thereafter subjected to a reduced pressure distillation, the fractions of distillate rich in the methyl esters of diphenylcarboxylic acids can be easily recovered. Furthermore, it is found that, upon treating the distillate with a monohydric lower aliphatic alcohol or an aromatic hydrocarbon, the insoluble dimethyl 4,4'-diphenyldicarboxylate can be easily separated from other soluble components, i.e., trimethyl 2,4', 5-diphenyltricarboxylate, dimethyl 2,4-diphenyldicarboxylate, and dimethyl 3,4'-diphenyldicarboxylate, etc. The temperature and pressure conditions of the reduced pressure distillation after the heat-treatment are suitably selected from the ranges indicated by the diagonal lines-filled area in the attached drawing. For example, under a reduced pressure of 10 mm Hg, the fractions distilled at approximately 180°–280°C. are collected. It should be obvious that the distillate of higher purity can be obtained by collecting the distillate within a narrower temperature range, under sufficient refluxing.

The preferred monohydric lower aliphatic alcohol or aromatic hydrocarbon to be used as the solvent for treating the distillate includes methanol, benzene, and xylene. For example, the distillate is dissolved in hot solvent of 10 weight times thereof, cooled, and filtered. Thus the insoluble dimethyl 4,4'-diphenyldicarboxylate can be recovered. Then the solvent is removed from the filtrate by distillation, to leave the methyl esters of diphenylcarboxylic acids other than dimethyl 4,4'-diphenyldicarboxylate. Such easy recovery of diphenylcarboxylic acid methyl esters is still another advantage of the present invention.

Hereinafter the invention will be explained with reference to working Examples, which are given for the purpose of facilitating the understanding of this invention and are never to be construed to limit the scope thereof. In the Examples, composition and percentages are by weight, unless otherwise specified.

EXAMPLE A

A 1:1.4 mixture of p-xylene with methyl p-toluate was liquid-phase oxidized with air continuously, with the average residence time of 6 hours at 165°C. and 4 kg/cm$^2$G, in the presence of cobalt acetate and manganese acetate. Thus an oxidation product composed chiefly of p-toluic acid and monomethyl terephthalate was obtained. The quantities of cobalt and manganese in the oxidation product were, each calculated as pure metal, respectively 0.0116 percent and 0.0006 percent. Then the oxidation product was esterified with methanol, to form an esterified mixture composed chiefly of methyl p-toluate and dimethyl terephthalate (the method described in the specification of Application Ser. No. 177.454).

This esterified mixture was continuously distilled in a column at a top pressure of 100 mmHg and a bottom temperature of 226°C., to separate therefrom dimethyl terephthalate and the compounds having boiling points lower than that of dimethyl terephthalate. Because the resulting distillation residue still contained a considerable amount of dimethyl terephthalate, it was further distilled at the column-top pressure of 15 mmHg and bottom temperature of 238°C. Thus the useful components such as dimethyl terephthalate and methyl p-toluate, etc., were continuously distilled off from the system, leaving a distillation residue which was substantially free from any of the useful components. The residue contained 1.2% of dimethyl terephthalate as the only useful component, and the residual cobalt and manganese were, respectively, 0.142 percent and 0.007 percent, when calculated as the pure metals.

200 Grams each of the distillation residue was separately placed in 300-ml capacity three neck flasks, and heated under a reduced pressure at various temperatures for various time lengths as indicated in Table 1 below. The heating was effected while distilling off the product as formed. The total yields of the distilled useful products, i.e., dimethyl terephthalate, methyl p-toluate, methyl p-formylbenzoate, monomethyl terephthalate, and p-toluic acid, are shown also in Table 1 below. Incidentally, before the heat-treatment 2.4 g of dimethyl terephthalate was the only useful component in 200 g of the distillation residue. Also the compositions of the useful products obtained in Run Nos. A-6 and A-12 are shown in later-given Table 3.

Table 1

| Run No. | Heat-treating Temp. (°C.) | Heat-treating Time (hr.) | Total Yield of Useful Products (g) |
|---|---|---|---|
| A-1 | 250 | 4 | 5.6 |
| A-2 | " | 8 | 9.2 |
| A-3 | " | 16 | 12.5 |
| A-4 | 270 | 4 | 20.8 |
| A-5 | " | 8 | 29.9 |
| A-6 | " | 16 | 40.3 |
| A-7 | 290 | 2 | 26.4 |
| A-8 | " | 4 | 36.3 |
| A-9 | " | 8 | 45.6 |
| A-10 | 310 | 1 | 32.1 |
| A-11 | " | 2 | 43.7 |
| A-12 | " | 4 | 56.5 |
| A-13 | 330 | 1 | 41.6 |
| A-14 | " | 2 | 52.8 |
| A-15 | " | 4 | 65.3 |
| A-16 | 350 | 0.5 | 41.6 |
| A-17 | " | 1 | 49.5 |
| A-18 | " | 2 | 61.4 |
| A-19 | 380 | 0.5 | 30.3 |
| A-20 | " | 1 | 39.2 |
| A-21 | " | 1.5 | 44.1 |
| A-22 | 410 | ⅓ | 9.4 |
| A-23 | " | ⅔ | 9.8 |
| A-24 | " | 1 | 10.0 |

EXAMPLE B (CONTROLS)

For comparison, the oxidation reaction was effected similarly to that of Example A, except that cobalt acetate was the only oxidation catalyst employed. After the post-treatments similarly to those of Example A, a distillation residue was obtained, which contained only 1.3 percent of dimethyl terephthalate and 0.148 percent of residual cobalt calculated as pure metal.

200 Grams each of the distillation residue was heat-treated similarly to Example A, at various temperatures for various time lengths as indicated in Table 2. The total yield of the useful products distilled in each run was as shown also in Table 2. Before the heat-treatment, 2.6 g of dimethyl terephthalate was the only useful component contained in 200 g of the residue.

Also the compositions of the useful products obtained in Run Nos. B-2 and B-4 are shown in Table 3.

Table 2

| Run No. | Heat-treating Temp. (°C.) | Heat-treating Time (hr.) | Total Yield of Useful Products (g) |
|---|---|---|---|
| B-1 | 270 | 8 | 5.1 |
| B-2 | " | 16 | 6.3 |
| B-3 | 310 | 2 | 7.5 |
| B-4 | " | 4 | 9.4 |
| B-5 | 330 | 2 | 8.8 |
| B-6 | " | 4 | 10.3 |

Upon comparing the results given in Tables 1 and 2, as well as those in Table 3, it can be understood that when a cobalt compound alone is used as the oxidation catalyst, only a very small amount of the useful products is recoverable from the distillation residue, while a surprisingly large amount of the useful products can be recovered from the distillation residue by the heat-treatment according to the invention, when a manganese compound (component A) and cobalt compound (component B) are concurrently used as the oxidation catalyst.

EXAMPLE C

Three (3) kg of the distillation residue used as the starting material in the heat-treatment of Example A was mixed with 6 kg of water, and heated to 95°C. for 2 hours under stirring. Immediately thereafter the system was separated into two phases. The greatest parts of the cobalt and manganese contained in the distillation residue were extracted into the aqueous phase and recovered. Thus an extraction residue containing 0.004 percent of cobalt, calculated as pure metal, and substantially no manganese, was obtained. 200 Grams each of this extraction residue was heat-treated similarly to Example A, at various temperatures for various time lengths as indicated in Table 4. The total yields of the distilled useful products in each run were as shown in Table 4.

Incidentally, the only useful component contained in 200 g of the extraction residue before the heat-treatment was 2.4 g of dimethyl terephthalate.

Table 4

| Run No. | Heat-treating Temp. (°C.) | Heat-treating Time (hr.) | Total Yield of Useful Products (g) |
|---|---|---|---|
| C-1 | 250 | 8 | 4.5 |
| C-2 | 250 | 16 | 6.2 |
| C-3 | 290 | 2 | 13.2 |
| C-4 | 290 | 4 | 21.1 |
| C-5 | 290 | 8 | 30.4 |
| C-6 | 310 | 1 | 17.8 |
| C-7 | 310 | 2 | 30.4 |
| C-8 | 310 | 4 | 42.9 |
| C-9 | 330 | 1 | 35.0 |
| C-10 | 330 | 2 | 54.2 |
| C-11 | 330 | 4 | 65.3 |
| C-12 | 350 | 0.5 | 42.3 |
| C-13 | 350 | 1 | 56.1 |
| C-14 | 350 | 2 | 68.5 |
| C-15 | 380 | 0.5 | 34.6 |
| C-16 | 380 | 1 | 44.8 |
| C-17 | 380 | 1.5 | 49.1 |
| C-18 | 410 | ⅓ | 9.6 |
| C-19 | 410 | ⅔ | 10.0 |
| C-20 | 410 | 1 | 10.4 |

Table 3

| Run No. | Oxidation Catalyst | Treating Temp. (°C.) and Time (hrs.) | Dimethyl Terephthalate (g) | Methyl p-Toluate (g) | Methyl p-Formyl-benzoate (g) | Mono-methyl Terephthalate (g) | p-Toluic Acid (g) | Total (g) | Useful Component Before Heat-treatment (g) |
|---|---|---|---|---|---|---|---|---|---|
| A-6 | Cobalt and manganese | 270°C. 16 hrs. | 28.8 | 7.2 | 0.6 | 0.9 | 2.8 | 40.3 | 2.4 g |
| A-12 | | 310°C. 4 hrs | 34.3 | 14.7 | 2.5 | 1.0 | 4.0 | 56.5 | |
| B-2 | Cobalt | 270°C. 16 hrs. | 4.9 | 0.9 | 0.1 | 0.2 | 0.2 | 6.3 | 2.6 g |
| B-4 | | 310°C. 4 hrs. | 6.4 | 1.9 | 0.3 | 0.5 | 0.3 | 9.4 | |

EXAMPLE D

A 1:1.2 mixture of p-xylene and methyl p-toluate was oxidized at liquid phase with air at various temperatures indicated in Table 5 under a pressure of 4 kg/cm²G, in the presence of various oxidation catalysts as specified also in Table 5. Thus the oxidation products composed chiefly of p-toluic acid and monomethyl terephthalate were obtained. The amount of the catalyst remaining in each of the oxidation products was as given in Table 5 below, calculated as the corresponding pure metal.

Each of the oxidation product was esterified with methanol similarly to Example A, and the product was distilled. Whereupon crude dimethyl terephthalate was separated, and the distillation residue containing substantially no useful products was obtained. 200 Grams each of the distillation residues were heat-treated at various temperatures for various time lengths as specified in Table 5, in the manner similar to Example A. The total yields of the useful products obtained in each run were as shown also in Table 5.

the result is substantially the same with the case of employing the cobalt compound alone.

EXAMPLE E

200 Grams of the distillation residue used as the starting material in the heat-treatment of Example A was charged in a pressure vessel, and the vessel was closed air-tightly. The system was rapidly heated to 330°C., and maintained at said temperature for 24 hours.

During the heat-treatment, minor amounts each of the reaction mixture were withdrawn from the system at the time intervals indicated in Table 6 below, by way of sampling, and subjected to gas chromatography. Thus changes in the composition of the reaction mixture were determined as shown also in Table 6.

After the 24 hours of heating, the vessel was cooled and the contents were distilled under a reduced pressure. Thus, 40.7 g of useful products were recovered in the distillate.

Table 5

| Run No. | Oxidation Reaction Temp. (°C.) | Oxidation Catalyst Type | Metal Concentration in Oxidation Product(wt.%) | Total Amount of Useful Components Before Heat-treatment (g) | Heat-treating Temp. (°C.) | Heat-treating Time (hr.) | Total Yield of Distilled Useful Products (g) |
|---|---|---|---|---|---|---|---|
| D-1 | 160 | Cobalt naphthenate | 0.0208 | 2.3 | 290 | 8 | 37.0 |
|  |  | Manganese naphthenate | 0.0025 |  |  |  |  |
| D-2 | 160 | " | " | 2.3 | 330 | 4 | 54.4 |
| D-3 | 170 | " | " | 1.8 | 290 | 8 | 54.3 |
| D-4 | 170 | " | " | 1.8 | 330 | 4 | 75.8 |
| D-5 | 180 | " | " | 2.6 | 290 | 8 | 76.8 |
| D-6 | 180 | " | " | 2.6 | 330 | 4 | 101.2 |
| D-7 | 160 | Cobalt naphthenate | 0.0236 | 2.5 | 330 | 4 | 10.5 |
| D-8 | 160 | Cobalt naphthenate | 0.0214 | 2.4 | 330 | 4 | 9.8 |
|  |  | Nickel naphthenate | 0.0023 |  |  |  |  |
| D-9 | 160 | Cobalt naphthenate | 0.0206 | 2.1 | 330 | 4 | 10.2 |
|  |  | Chromium naphthenate | 0.0026 |  |  |  |  |

From the results of Table 5 above, it can be understood that when a manganese compound and a cobalt compound are used as the oxidation catalyst, the total yield of the useful component recoverable from a fixed amount of the distillation residue increases with the rise in the oxidation reaction temperature from 160°C. to 180°C.

It is again clearly demonstrated that the composition of the distillation residues resulting from the process with which the present invention is concerned, is markedly different from that of the distillation residue from the conventional process using a cobalt compound only as the oxidation product. The recovery of large amounts of the useful components is a unique phenomenon achievable only with the distillation residues from the runs employing a cobalt compound and a manganese compound as the oxidation catalyst. As shown in Table 5, when a nickel compound or a chromium compound is concurrently used with the cobalt compound, Table 6

| Heating time (hr.) | Content of Useful Component (%) |
|---|---|
| 0 (Starting material) | 1.2 |
| 0.5 | 16.9 |
| 1 | 21.7 |
| 2 | 26.9 |
| 4 | 33.3 |
| 8 | 34.0 |
| 12 | 31.3 |
| 16 | 28.6 |
| 20 | 25.2 |
| 24 | 22.1 |

EXAMPLE F

An assembly for making dimethyl terephthalate from p-xylene by the Witten-Hercules process, comprising oxidation apparatus for oxidizing a mixture of p-xylene with methyl p-toluate at liquid phase with air, esterification apparatus for esterifying with methanol the oxidation product composed chiefly of p-toluic acid and monomethyl terephthalate, distillation apparatus for reduced pressure-distilling the esterified product to separate crude dimethyl terephthalate and the compounds having the boiling points lower than that of dimethyl terephthalate from the distillation residue, purification apparatus for purifying the crude dimethyl terephthalate, reduced pressure-distillation apparatus for recovering the residual useful component from the distillation residue of the esterified product to recirculate the same to the main reaction system thereby providing the distillation residue containing substantially no useful component as the bottom, and heat-treating apparatus for treating the last-mentioned distillation residue according to the present method and returning the formed useful component to the main reaction system, was operated for a prolonged period under the various conditions specified in Table 7 below. Thus the yield per day of refined dimethyl terephthalate, molar yield of the formed refined dimethyl terephthalate to the p-xylene consumed, and the quantity of distillation residue formed per day, which was obtained as the bottom of the reduced pressure-distillation apparatus and was substantially free from the useful component, were determined. Furthermore, when the heat-treating apparatus was not operated, the distillation residue was removed from the system, and when operated, the residue was heated at 330°C. under a reduced pressure, for average residence time of 7 hours. The formed useful component was continuously recovered by distillation. The residue from the heat-treatment was discarded.

through the liquid phase oxidation of a mixture of p-xylene and methyl p-toluate with air at 160°C. under a pressure of 4 kg/cm$^2$G, in the presence of cobalt acetate and manganese acetate.

The oxidation product was esterified with methanol, to form an esterification product composed chiefly of methyl p-toluate and dimethyl terephthalate, in accordance with the process disclosed in the application Ser. No. 177,454.

This esterified mixture was distilled, and the dimethyl terephthalate and the components boiling at lower temperatures than the boiling point of dimethyl terephthalate were separated. Because the remaining distillation residue still contained a considerable quantity of dimethyl terephthalate, the residue was further distilled to allow the recovery of dimethyl terephthalate, methyl p-toluate, and the like. Thus a distillation residue containing substantially no useful component was obtained.

600 Grams of this distillation residue was charged in a 1,000-cc capacity three neck flask, and heated at 350°C. for 3 hours under normal pressure. During this heat-treatment, 154 g in total of newly formed dimethyl terephthalate, methyl p-toluate, methyl p-formylbenzoate, etc. were recovered by distillation. Then the residue remaining in the heated system was further distilled at a vacuum of 10 mmHg, to collect all the distillate recoverable at the temperatures ranging from 180° to 250°C. The total of the distillate amounted 128 g, which was composed chiefly of methyl esters of diphenylcarboxylic acids.

Table 7

| Run No. | Oxidation Catalyst | Oxidation Temp. (°C.) | Heat-treating Apparatus | Dimethyl Terephthalate Yield (parts/day) | Molar Yield (%) | Distillation Residue Formed (parts/day) | Distillation Residue/ Dimethyl Terephthalate |
|---|---|---|---|---|---|---|---|
| F-1 | Cobalt acetate and manganese acetate | 180 | Operated | 238 | 90.3 | 18.8 | 0.079 |
| F-2 | '' | 180 | Idle | 233 | 85.9 | 19.0 | 0.081 |
| F-3 | Coblat acetate alone | 150 | Operated | 111 | 81.4 | 7.0 | 0.063 |
| F-4 | '' | 150 | Idle | 110 | 81.0 | 6.9 | 0.063 |

The results shown in above Table 7 demonstrate that when cobalt acetate and manganese acetate are concurrently used as the oxidation catalyst, the oxidation can be performed at extremely higher reaction rates than when compared with the runs using cobalt acetate alone. Consequently the dimethyl terephthalate yield is notably increased and the molar yield is high. The molar yield can be still improved, furthermore, because appreciable quantities of the useful component can be recovered from the distillation residue by the heat-treatment according to the present invention. The difference in molar yields between the runs F-1 and F-2 is 4.4 %, and that difference is economically highly significant, because dimethyl terephthalate is produced on large scales industrially. On the other hand, when cobalt acetate alone is used as the oxidation catalyst, substantially no improvement in molar yield is achieved by the heat-treatment.

EXAMPLE G

An oxidation product composed chiefly of p-toluic acid and monomethyl terephthalate was obtained 50 Grams of this distillate was dissolved in 200 ml of methanol under heating. The solution was once cooled to room temperature, and the methanol-insoluble component was separated by filtration. Drying the insoluble component, 4.1 g of crystalline methyl diphenylcarboxylate was obtained.

When the crystals was analyzed by gas chromatography, it contained 90.2 percent of dimethyl 4,4'-diphenydicarboxylate and 9.8 percent of trimethyl 2,4-°,5-diphenyltricarboxylate. Washing the crystals three times with methanol, 3.3 g of 100 percent dimethyl 4,4'-diphenyldicarboxylate was obtained.

In contrast to the above, when 600 g of the above-mentioned distillation residue was again distilled in the vacuum of 10 mmHg and the distillates evaporating at the temperatures ranging from 180° to 230°C. were collected, without the preceding heat-treatment, the total of the recovered distillate was 248 g, which contained a large amount of compounds other than methyl diphenylcarboxylate.

50 Grams of the distillate was similarly washed with methanol three times. Whereupon 1.9 g of a crystalline product was obtained, which contained 61.4 percent of dimethyl 4,4'-diphenyldicarboxylate and 18.2 percent of trimethyl 2,4°,5-diphenyltricarboxylate, as determmined by means of gas chromatography.

We claim:

1. A process for increased production of dimethyl terephthalate and the intermediate products thereof which comprises:
   I. oxidizing a mixture of para-xylene and methyl paratoluate in a weight ratio of 2:1 to 1:4 with molecular oxygen or a gas containing molecular oxygen in the liquid phase at a temperature within the range of 140° to 240°C. and in the presence of a catalyst consisting essentially of
      A. a first component which is manganese metal, a manganese compound soluble in the reaction system, or a mixture thereof, and
      B. a second component which is cobalt metal, a cobalt compound soluble in the reaction system, or a mixture thereof,
   the gram-atomic ratio of manganese metal to cobalt metal being 0.1:99.9 to 99:1 when the components are calculated as manganese metal and cobalt metal respectively, the concentration of the catalyst being adjusted so that when the components are calculated as metal their total weight is 50 to 1,500 ppm by weight based on the total weight of the reaction system; then
   II. esterifying the reaction product with methanol; then
   III). distilling the esterified reaction product to remove dimethyl terephthalate and other compounds having boiling points lower than dimethyl terephthalate and leave a residue comprising reaction products having a boiling point higher than that of dimethyl terephthalate; then
   IV. heating the residue to a temperature of from 260° to 400°C. for a time of at least 20/(T-250) hours, wherein T is the temperature in degrees centigrade, thus producing additional dimethyl terephthalate and intermediate products; and
   V. distilling the heated residue to remove the additional dimethyl terephthalate and intermediate products formed by the heating, to leave a second residue.

2. The process of claim 1 wherein the temperature of step I is from 160° to 220°C.

3. The process of claim 2 wherein the temperature of step IV is from 280° to 380°C.

4. The process of claim 3 wherein the temperature of step IV is from 300° to 370°C.

5. The process of claim 1 wherein the time of step IV is greater than or equal to 50/(T-250) and less than or equal to 1500/(T-250) hours.

6. The process of claim 1 with the additional step of distilling the second residue under a pressure of from 1 to 70 mm Hg, a minimum temperature ranging from 120°C. at 1 mm Hg to 220°C. at 70 mm Hg, and a maximum temperature ranging from 260°C. at 1 mm Hg to 320°C. at 70 mm Hg, to effect recovery of di- and tri-methyl esters of diphenyl di- and tri-carboxylic acids.

7. The process of claim 1 wherein step V is conducted subsequently to step IV.

8. The process of claim 1 wherein step V is conducted simultaneously with step IV.

9. The process of claim 4 with the additional step of removing any residual cobalt or manganese catalyst prior to step IV, by extraction.

10. The process of claim 6 with the additional step of solvent extraction from the second residue distillate of insoluble dimethyl 4,4'-diphenyldicarboxylate using a solvent which is methanol, benzene, or xylene.

11. The process of claim 5 wherein the time of step IV is greater than or equal to 100/(T-250) and less than or equal to 1000/(T-250) hours.

* * * * *